United States Patent
Ohara et al.

(10) Patent No.: US 8,886,248 B2
(45) Date of Patent: Nov. 11, 2014

(54) TRANSMISSION POWER ADJUSTMENT METHOD IN WIRELESS COMMUNICATION SYSTEM AND BASE STATION

(75) Inventors: Tatsunori Ohara, Yokohama (JP);
Mikio Kuwahara, Yokohama (JP);
Hajime Kanzaki, Hiratsuka (JP);
Tsukasa Sasayama, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 151 days.

(21) Appl. No.: 13/494,374

(22) Filed: Jun. 12, 2012

(65) Prior Publication Data
US 2013/0003669 A1 Jan. 3, 2013

(30) Foreign Application Priority Data
Jul. 1, 2011 (JP) ................................. 2011-146953

(51) Int. Cl.
| H04B 7/00 | (2006.01) |
|---|---|
| H04W 52/34 | (2009.01) |
| H04W 52/44 | (2009.01) |
| H04W 52/28 | (2009.01) |
| H04W 72/04 | (2009.01) |
| H04W 52/14 | (2009.01) |
| H04W 72/12 | (2009.01) |
| H04W 52/36 | (2009.01) |

(52) U.S. Cl.
CPC .......... *H04W 52/283* (2013.01); *H04W 52/146* (2013.01); *H04W 72/121* (2013.01); *H04W 52/346* (2013.01); *H04W 52/44* (2013.01); *H04W 52/367* (2013.01); *H04W 72/0453* (2013.01)
USPC ........................................... 455/522; 370/329

(58) Field of Classification Search
USPC ............ 370/328, 329; 455/39, 500, 507, 517, 455/522, 403, 422.1, 446, 447, 450, 452.1
See application file for complete search history.

(56) References Cited

U.S. PATENT DOCUMENTS

| 8,306,549 B2* | 11/2012 | Wang et al. ................. 455/452.2 |
|---|---|---|
| 8,559,360 B2* | 10/2013 | Kim et al. ..................... 370/318 |
| 2009/0291691 A1* | 11/2009 | Jeong et al. ................... 455/450 |
| 2010/0309866 A1* | 12/2010 | Katayama et al. ............ 370/329 |

FOREIGN PATENT DOCUMENTS

JP 2009-021787 A 1/2009

OTHER PUBLICATIONS

IEEE Std 802.16-2004; Air Interface for Fixed Broadband Wireless Access Systems—8.4 WirelessMAN-OFDMA PHY; 2004 pp. 493-629.

Mobile WiMAX—Part 1: A Technical Overview and Performance Evaluation; v2.8; Aug. 2006; pp. 1-53.

* cited by examiner

*Primary Examiner* — Chi Pham
*Assistant Examiner* — Weibin Huang
(74) *Attorney, Agent, or Firm* — Foley & Lardner LLP

(57) ABSTRACT

Necessary transmission power of terminals is secured while suppressing total transmission power in base station, so that FFR technology is realized with high frequency utilization efficiency to thereby realize both of compactness of base station and increase of communication capacity. Frequency resource is divided into frequency for boundary area of cell and frequency for central area of cell. Transmission power per unit frequency is fixed in the frequency for boundary area of cell and is set to be variable in the frequency for central area of cell. Transmission power per unit frequency is adjusted so as to satisfy necessary power of terminals connected to frequency for central area of cell. When it is judged that total transmission power of base station exceeds prescribed value, terminal is moved from central area to boundary area of cell, so that total transmission power is suppressed to be equal to or smaller than standard.

7 Claims, 17 Drawing Sheets

FIG.2
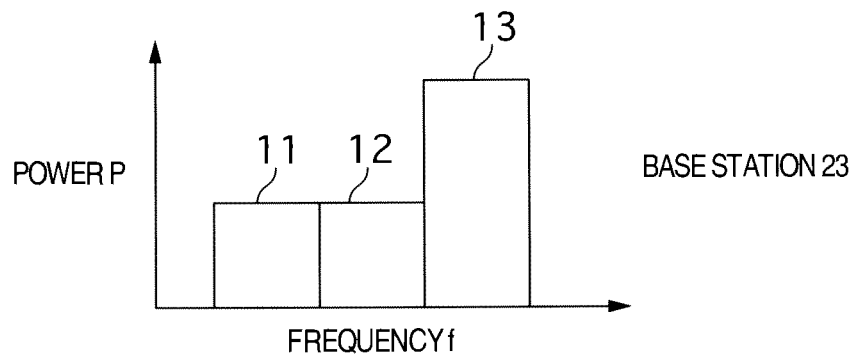
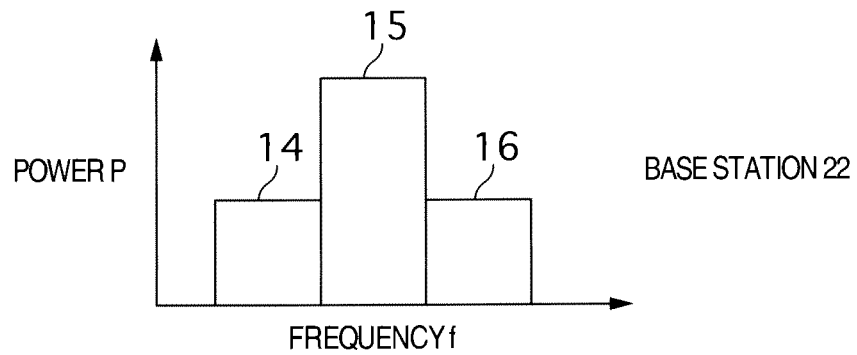
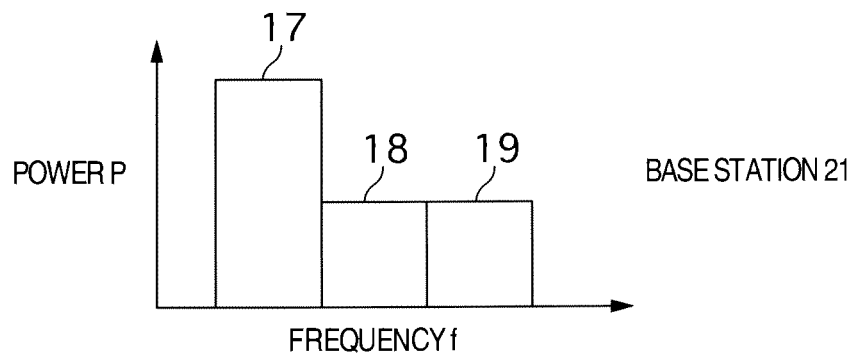

TRANSMISSION POWER ADJUSTMENT METHOD IN WIRELESS COMMUNICATION SYSTEM AND BASE STATION

INCORPORATION BY REFERENCE

The present application claims priority from Japanese application JP2011-146953 filed on Jul. 1, 2011, the content of which is hereby incorporated by reference into this application.

BACKGROUND OF THE INVENTION

The present invention relates to wireless communication technology and more particularly to the technology of controlling transmission power in each frequency band in a wireless communication system of cellular type.

Mobile wireless communication is required to constitute service area spreading as surface in order to communicate moving terminals with a base station, and the cellular system is generally used. In the wireless communication system of cellular system, plural base stations or antennas are distributed dispersedly and areas named cells in which wireless communication can be made are set within the range where radio waves from base stations or antennas are reached, so that the service area of wireless communication spreading as surface is formed. There is a case where the base station uses directional antenna to divide cell angularly and provides plural wave arrival areas named sectors. The cell configuration is generally three-sector configuration in which the cell is divided into three areas. The sector can be regarded as the cell formed by dividing space angularly by utilization of directivity of antenna. In the present invention, hereinafter, there is a case where the cell includes the concept of both of sector and cell.

In the wireless communication system, when a terminal can receive signal from plural base stations or antennas, the terminal is controlled to be connected to the base station having highest signal quality. Further, the wireless communication system has the structure of handover for handing over the base station for connecting the terminal successively with movement of the terminal, so that the wireless communication system can maintain wireless communication even while terminal is being moved. In order to secure connectivity upon movement of terminal between service areas, the service areas formed by base stations or antennas overlap each other in boundaries thereof. Signals transmitted by base stations or antennas are information for terminals connected to base stations or antennas, although the signals are interference for communication of terminal connected to other base stations or antennas. Such interference is disturbance for terminal subjected to the interference and causes deterioration in communication quality and reduction in throughput.

In order to reduce interference between base stations in boundaries of service areas, there is a case where area design is made in which three base stations adjacent to one another utilize different frequencies and three frequencies are allocated to base stations repeatedly within the wireless communication system to avoid interference. It is said to be used in Reuse 3. In contrast, area design that the same frequency is utilized repeatedly is said to be Reuse 1.

In the mobile WiMAX (refer to IEEE 802.16-2004 Part 16: Air Interface for Fixed Broadband Wireless Access System) paragraph 8.4 Wireless MAN-OFDMA PHY), there is known the structure of increasing frequencies capable of being used by base stations while reducing interference among base stations. In this structure, transmission powers of frequency resources are weighted in plural base stations or antennas mutually or frequency resources are selected to thereby share frequency resources to be utilized among plural base stations or antennas, so that occurrence of interference is suppressed and this structure is described as FFR (Fractional Frequency Reuse) in "Mobile WiMAX-Part I: A Technical Overview and Performance Evaluation" WiMAX Forum, March 2006. In this technique, frequency is used in Reuse 3 only in boundary parts of cells among adjacent cells and frequency is used in Reuse 1 in center parts of base stations.

Further, as technique of reduction in interference, there is a method described in JP-A-2009-21787. In this patent document, transmission frame is divided into sub-channel subset use zone and sub-channel use zone in time axis direction and sub-channel subset use zone is divided into plural zones in frequency axis direction, so that connection is allocated to previously decided zone in order of priority to form priority zone to which power necessary to improve signal quality until the signal quality reaches necessary signal quality is allocated.

SUMMARY OF THE INVENTION

In recent years, traffic in the mobile wireless communication is increased rapidly due to the spread of smart phone and net book. Communication systems can increase communication capacity if frequency can be added although since frequency resources allocated to communication systems are limited, it is not possible to add usable frequency easily. Accordingly, the wireless communication system is required to increase the communication capacity by raising the utilization efficiency of frequency within frequency band allocated to the wireless communication system presently. Particularly, in recent years, propulsion of FFR technique which raises the utilization efficiency of frequency is required while avoiding interference. Further, increase of area density (increase of the number of base stations installed in unit area) is required in order to cope with rapidly increased traffic. In order to increase the area density, it is necessary to mitigate installation conditions of base stations, although it is necessary to make the base stations smaller for that purpose. Transmission power of base stations is related to heating value and when the transmission power is increased, the capacity of base stations must be increased to secure the thermal capacity. Accordingly, transmission power is required to be controlled so as to make base stations smaller and suppress the thermal capacity. Transmission power of FFR is fixed and accordingly optimum transmission power control cannot be made on the condition that transmission power is limited. Further, in the method described in the patent document of JP-A-2009-21787, transmission power is variable, although frequency scheduling considering transmission power is not performed and accordingly there is a case where optimum control cannot be made similarly.

It is an object of the present invention to realize both of compactness of base station and increase of communication capacity by securing necessary power for terminals while suppressing total transmission power of base station and realizing FFR technique with increased utilization efficiency of frequency.

In order to solve the above problems, according to the present invention, radio lire controller of base station divides frequency band allocated to wireless communication system into plural frequency bands and, when a first frequency band of the plural frequency bands is allocated to a first terminal group and other frequency bands are allocated to a second terminal group different from the first terminal group to make communication, fixes transmission power per unit frequency for terminals in the first frequency band and adjusts transmission power per unit frequency on the basis of target transmission power of each to final for satisfying previously set standard in the second frequency band while controlling total transmission power for the first and second terminal groups to be equal to or smaller than maximum total transmission power previously set in the base station.

According to the present invention, since necessary power for terminals can be secured while suppressing total transmission power of base station and FFR technique can be realized with increased utilization efficiency of frequency, base station can be made smaller and communication capacity can be increased.

Other objects, features and advantages of the invention will become apparent from the following description of the embodiments of the invention taken it conjunction with the accompanying drawings.

BRIEF DESCRIPTION OF THE DRAWINGS

FIG. 2 is a diagram illustrating distributing of wireless resources of three adjacent base stations in application of FFR;

DETAILED DESCRIPTION OF THE INVENTION

Embodiments of the present invention are now described with reference to the accompany drawings.

Embodiment 1

First, configuration of a noble communication system to which the present invention is applied is described.

Figure 1:
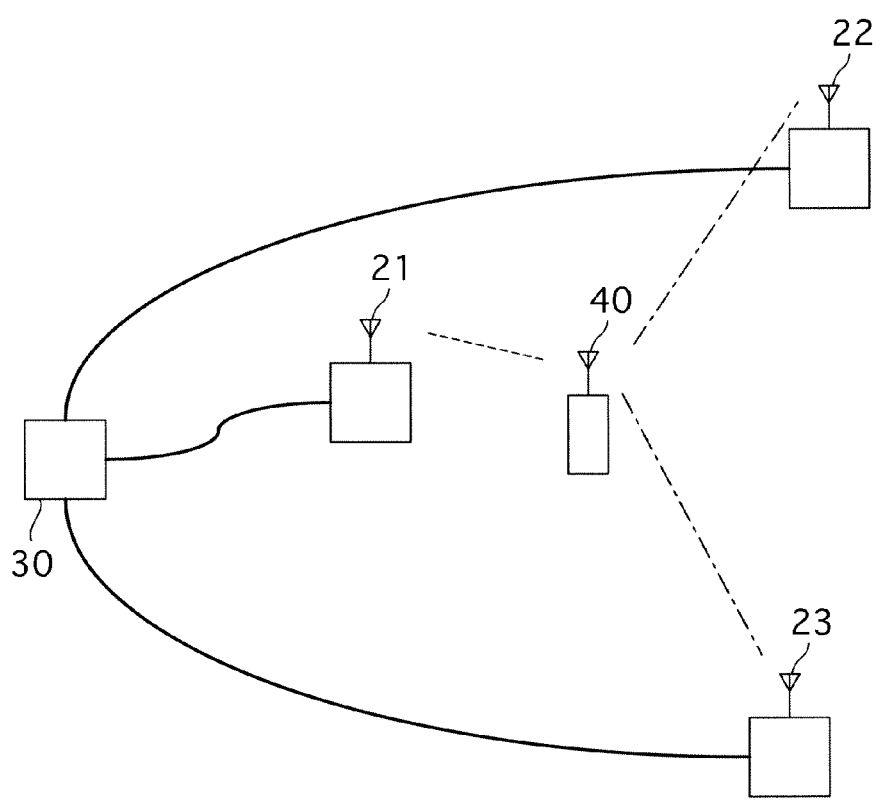
FIG. 1 is a diagram showing an example schematically illustrating a wireless communication system.

FIG. 1 is a diagram showing an example schematically illustrating a wireless communication system. Base stations 21 to 23 are connected to a core network through a core-side apparatus 30 and perform data communication. Base station 21 converts information obtained from core-side apparatus 30 into high-frequency signal and transmits it to terminal 40 as radio signal. Terminal 40 receives the radio signal and subjects it to signal processing to be converted into information, so that communication with core-side apparatus 30 is attained. On the other hand, information produced by terminal 40 is converted into high-frequency signal in terminal 40 to be transmitted to base station 21 as radio signal. The radio signal transmitted by terminal 40 and received by base station 21 is subjected to signal processing to be converted into information and the information is transmitted to core-side apparatus 30. Base stations 21 to are dispersedly distributed geographically and transmit signals at respectively different places. When terminal 40 receives signal transmitted by base station except base station 21, the signal is received as interference wave.

Figure 3:
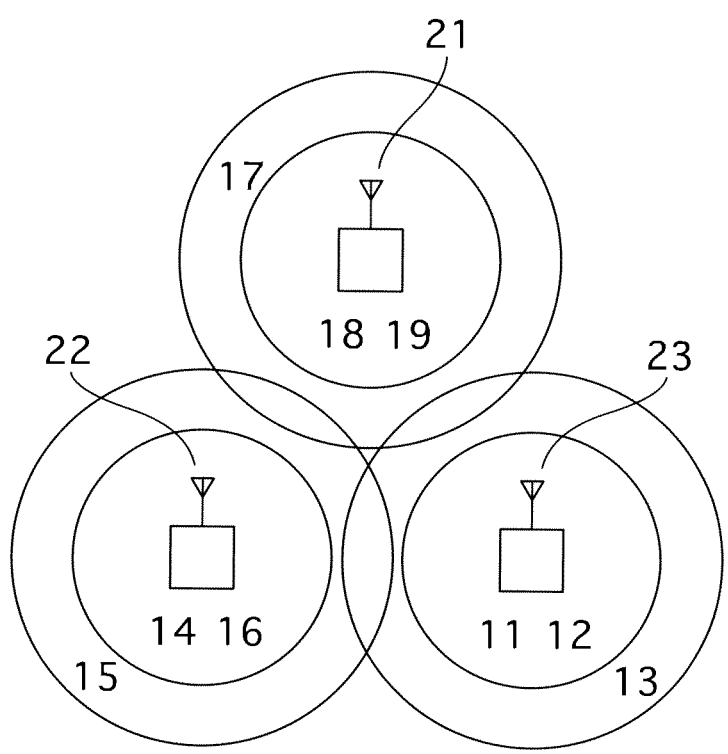
FIG. 3 shows an example of area design in FFR.
Figure 4:
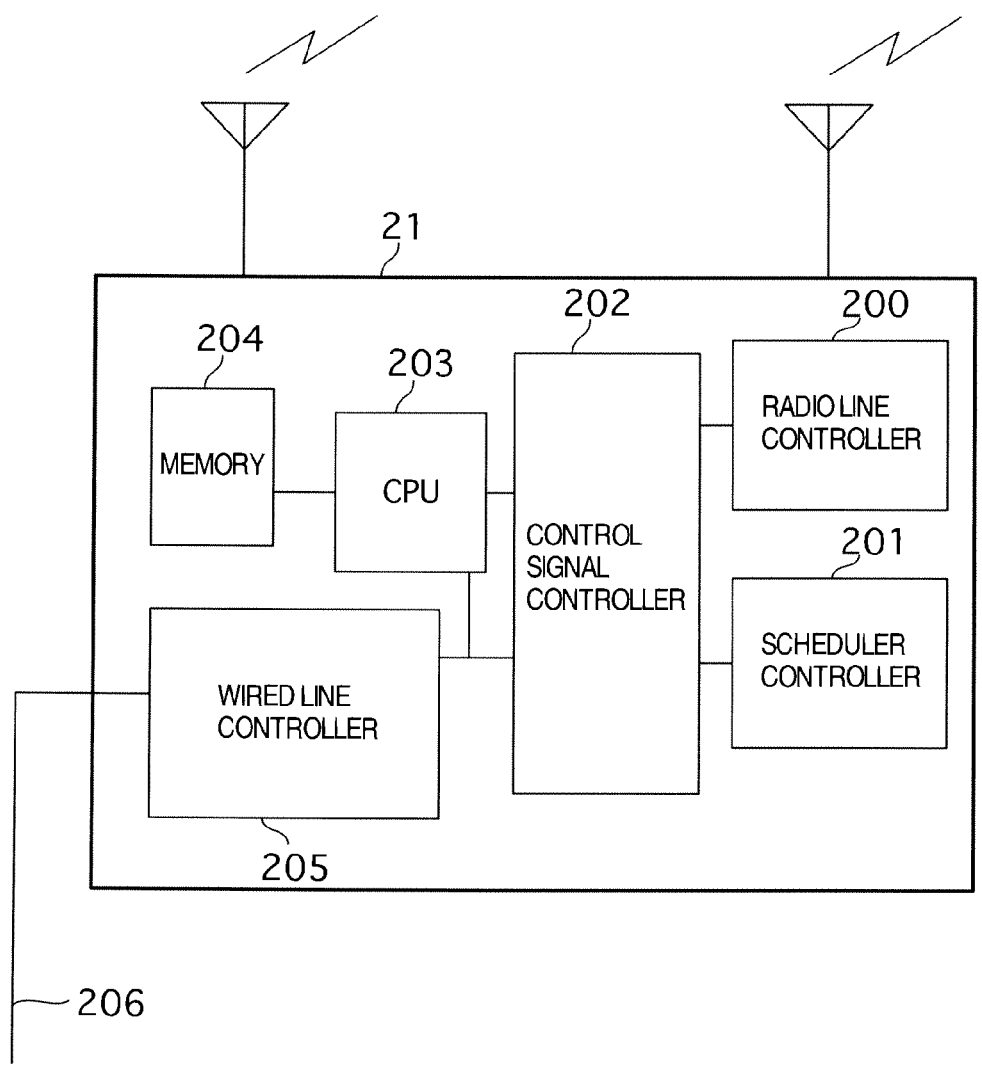
FIG. 4 is a block diagram showing an example schematically illustrating a base station.

As one method of reducing interference between base stations, there is known the above-mentioned FFR. FFR is technique that adjacent base stations share frequency resource among them mutually and weight transmission powers to suppress interference in particular frequency zone, so that throughput is improved. Referring now to FIGS. 3 and 4, FFR is described in detail.

FIG. 2 is a diagram illustrating distribution of wireless resources of three adjacent base stations in application of FFR.

FIG. 3 shows an example of area design using distribution of resource in FIG. 2.

In FIG. 2, vertical axis represents power P and horizontal axis represents frequency f.

The embodiment is described by taking Mobile WiMAX (Worldwide Interoperability for Microwave Access, Standard name IEEE 802.16e) as an example. In WiMAX, when the band usable in the whole system is, for example, 30 MHz, the frequency band is divided into plural groups in each of 10 MHz as shown in figure. In the system in which OFDM is used as modulation system of radio signal to be transmitted and received between base station and terminals as WiMAX, frequency band is a set of elements dismantled by FFT named sub-carriers. The group of frequency band is constituted by collecting plural sub-carriers. Sub-carrier is a minimum unit on frequency axis and one sub-carrier can transmit one symbol per unit time. Transmission power of base station is decided by product of transmission power per sub-carrier and the number of sub-carriers. Transmission power per sun-carrier is related to arrival range of radio waves. In the present invention, transmission power per sub-carrier is made to be variable and controlled.

In FIG. 2, frequency bands 11, 14 and 17 are the same frequency band. Similarly, frequency bands 12, 15 and 18 and frequency bands 13, 16 and 19 are also the same frequency bands, respectively. When base station 21 is taken as an example, frequency bands denoted by 18 and 19 and having low transmission power per sub-carrier are allocated to central area of cell. Even in base stations 22 and 23, similarly, frequency bands 11, 12 and 14, 16 having low transmission power per sub-carrier are allocated to central area of cell. Frequency bands 13, 15 and 17 are allocated to boundary area of cell.

When allocation of frequency bands is made as described above, area design as shown in FIG. 3 is worked out. Since different frequency bands 13, 15 and 17 are allocated to boundary areas of cells in which cells of base stations 21, 22 and 23 overlap each other, there is no place in which the same frequency overlaps each other and frequency bands 11, 12, 14, 16, 18 and 19 in central areas of cells contain the same frequency band but the central areas do not overlap since the central area is located in the center of cell.

As described above, in FFR, the same frequency band is not used as frequency bands allocated to mobile terminals in boundary areas of cells among adjacent base stations, so that interference in boundary areas of cells is avoided. Frequency bands having low transmission power per sub-carrier are allocated to central areas of cells of base stations to reduce interference of frequency, so that the same frequency can be utilized even in adjacent base stations. Thus, FFR is technique of coning with both reduction of interference and utilization efficiency of frequency.

FIG. 4 is a block diagram showing an example schematically illustrating a base station. Base station 21 is provided with plural transmit-receive antennas. Further, base station 21 includes a radio line controller 200, a scheduler controller 201, a control signal controller 202, a CPU 203, a memory 204 and a wired line controller 205. The wired line controller 205 is connected to a network line 206. Signaling used for exchange of information with terminals and adjacent base stations is produced by control signal controller 202 and is aha transmitted to terminal through radio line controller 200 and antenna at the timing designated by scheduler controller 201. Signaling on wired side is transmitted through wired line controller 205 and network line 206 to adjacent base station. Processing in controllers is performed by CPU 203 and necessary data is stored in memory 204.

Figure 5:
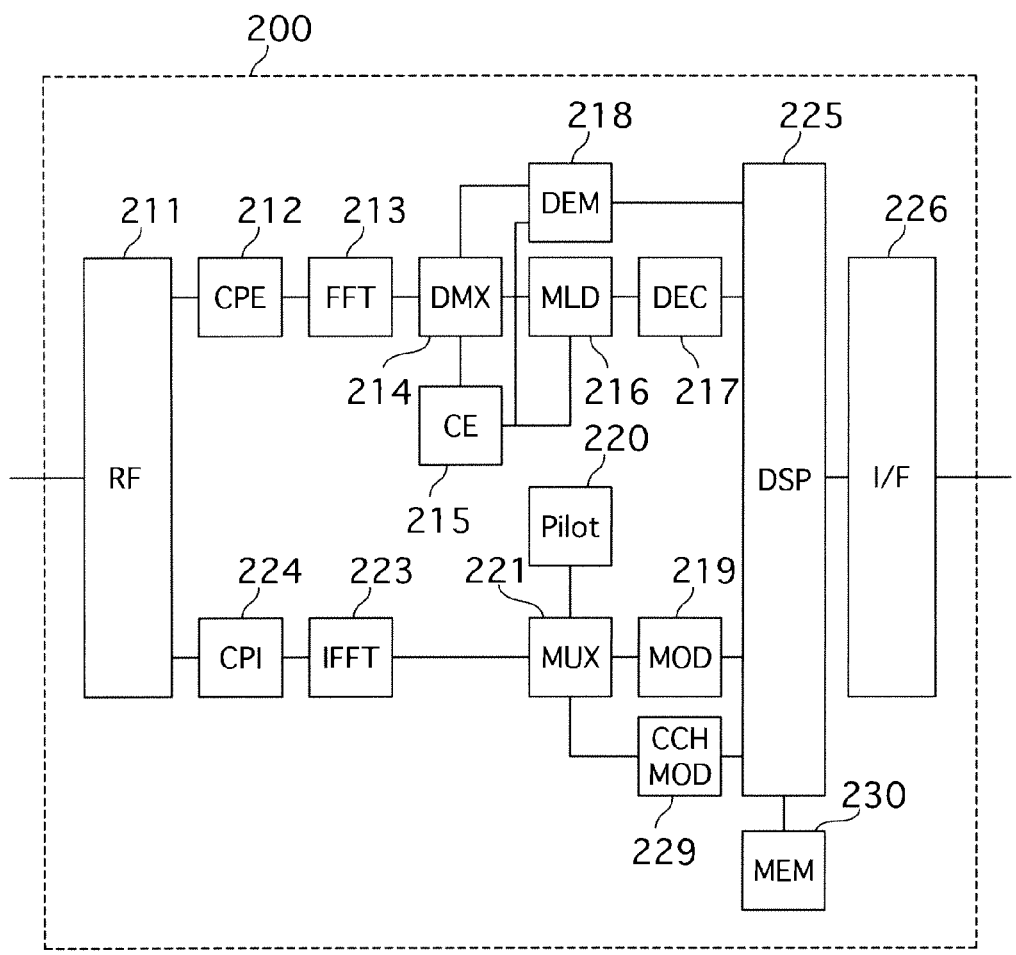
FIG. 5 is a block diagram showing an example schematically illustrating a radio line controller.

FIG. 5 is a block diagram showing an example schematically illustrating a radio line controller.

In the embodiments, radio line controller of OFDMA (Orthogonal Frequency Division Multiple Access) is shown.

Signaling to terminal in the embodiment is prepared by DSP (Digital Signal Processor) 225. First of all, signal received by antenna is supplied to RF (Radio Frequency) part 211 from left and is converted into digital signal. The signal converted into digital signal is supplied to CPE (Cyclic Prefix Extraction) part 212 in which CP is removed at the timing inherent to base station. CP is an abbreviation of Cyclic Prefix and is added to remove influence of delay waves. CPE part 212 performs preprocessing of removing CP and subjecting the signal to FFT (Fast Fourier Transform). The received signal from which CP is removed is subjected to FFT in FFT part 213. Signal in time domain is dismantled into frequency domain by FFT part and is separated to information for each sub-carrier. DMX (Demultiplexing) part 214 recognizes received signal as information divided in frequency×time and dismantles channel in accordance with resource allocation decided by scheduler realized in DSP 225. The signals are mainly divided into pilot signal, control signal and user data signal. The pilot signal (or reference signal) is sent to CE (Channel Estimation) part 215 to be utilized for estimation of propagation path.

The control signal is supplied to DEM (Demodulation) part 218 to be demodulated using propagation estimated result calculated by CE part 215 by means of MMSE (Minimum Mean Square Error) method or similar method to decode encoding in propagation path. Information transmitted from terminal as control signal contains ACK/NACK representing success or failure in packet transmission on downstream channel, CINR (Carrier to Interference and Noise Ratio) of relevant base station measured at terminal, received signal power RSSI (Received Signal Strength Indication), reception level of adjacent base station for the purpose of handover and the like. Such control signals obtained by decoding are stored in memory 230 of DSP 225 and are used as support of scheduler realized in DSP 225. User data signal is supplied to MLD (Maximum Likelihood Detection) part 216 and is subjected to MLD (Maximum Likelihood Detection) using propagation path estimation result calculated by CE part 215. Logarithmic likelihood ratio calculated by MLD part 216 is supplied to DEC (Decoding) part 217 and is subjected to turbo decoding processing by DEC part 217. Information obtained is supplied to DSP 225 and is transmitted to core-side apparatus not shown through network interface 226 after layer 2 processing is performed.

Information transmitted from core-side apparatus is stored in memory 230 through network interface 226 and is allocated proper resources by scheduler realized in DSP 225 to be subjected to modulation processing on the basis of its result and be transmitted from antenna. User data information stored in memory 230 is read out by indication of scheduler to be subjected to turbo coding, coding processing such as interleaving and modulation processing to QPSK (Quadrature Phase Shift Keying) code or the like by MOD part 219. The modulated information is arranged in resource designated by scheduler in MUX (Multiplexing) part 221. At this time, pilot produced by pilot production part 220 and control channel prepared by control channel modulation part 229 are arranged together therewith. Further, transmission power decided by DSP is set to each of major groups. Control channel has information prepared by DSP 225 and is to be subjected to modulation processing by control channel modulation part 229. Transmission information combined by MUX part 221 is converted to time domain by IFFT part 223. The information is supplied to CPI part 224 in which CP is added thereto and then supplied to RF part 211. RF part 211 subjects the information to conversion from digital signal to h-frequency signal and amplification and outputs the information to antenna not shown.

Figure 6:
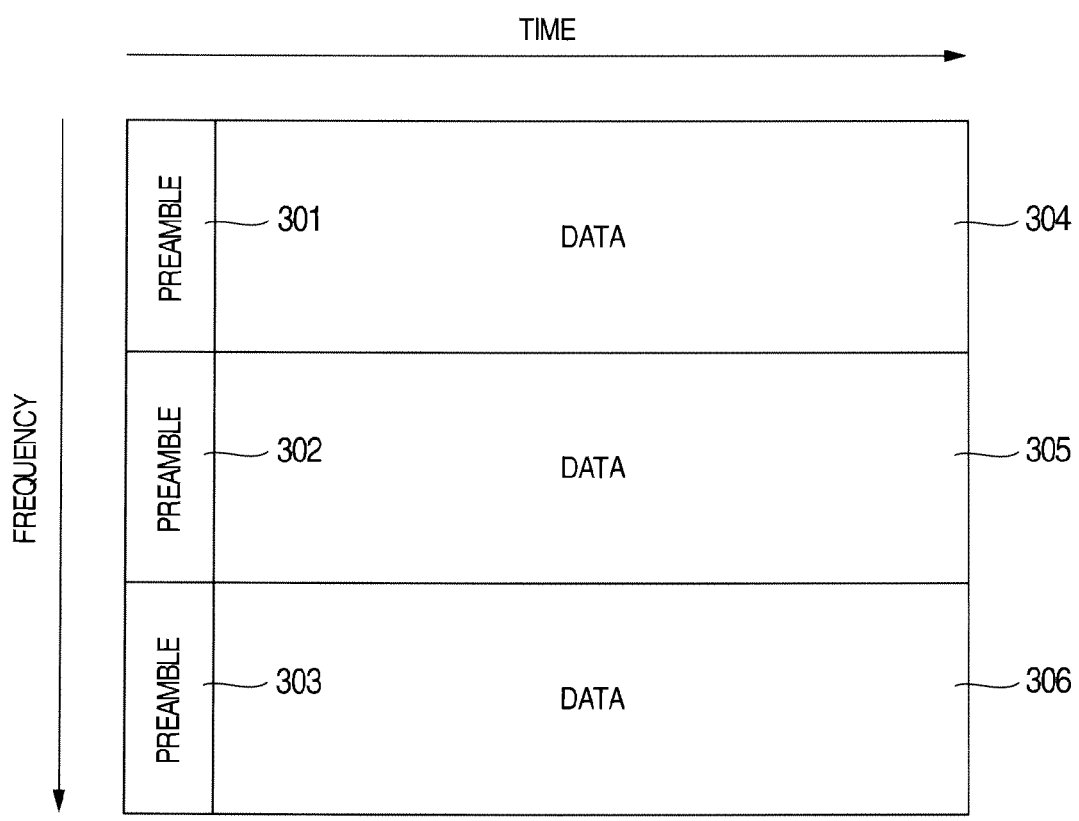
FIG. 6 is a mapping diagram of transmission frame of Mobile WiMAX.

FIG. 6 is a mapping diagram defined by frequency axis and time axis, of transmission frame of Mobile WiMAX. Signals named preambles 301, 302 and 303 are provided at the head of time axis to synchronize all terminals connected to base station. Transmission timings of the preambles are synchronized by GPS (Global Positioning System) and accordingly all base stations are synchronized. If synchronization is off, there arises a problem that synchronization is not taken at the time of handover and frequency is not changed correctly since synchronization is off upon frame configuration for changing frequency domain by time, so that interference occurs. Data 304, 305 and 306 are transmitted next to preambles. In embodiment 1, 301 and 304, 302 and 305, and 303 and 306 are different frequency groups. Since the fact that frequency groups are different is equivalent to the fact that base stations are different, change measures to different frequency group is handover. Further, it is possible to set different communication standards to different frequency groups. For example, IEEE16e and IEEE16m of succeeding standard are standardized in Mobile WiMAX and particular frequency can be standardized by IEEE16e and other frequency can be standardized by IEEE16m.

An embodiment of algorithm of the present invention is now described.

Figure 7:
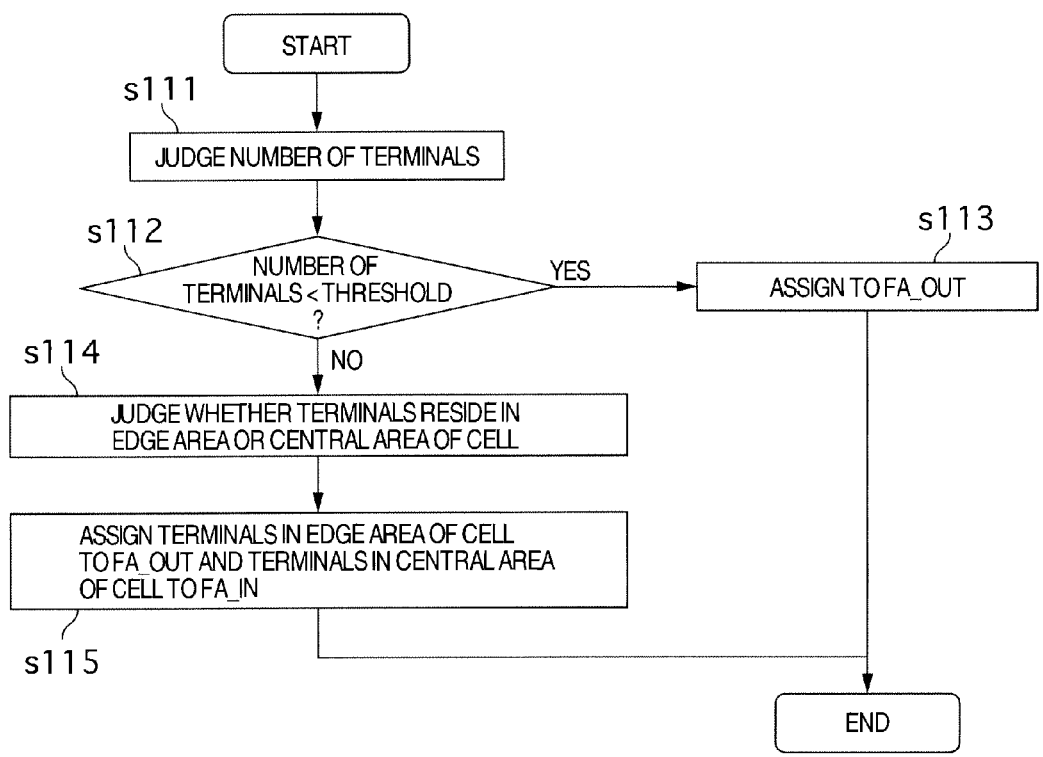
FIG. 7 is a flow chart showing processing at the time of allocation of terminals in base station in an embodiment of the present invention.

FIG. 7 is a flowchart showing processing at the time of allocation of terminals in base station in an embodiment of the present invention.

The processing shown in FIG. 7 is performed at the time of initial connection of terminal named INE (Initial Network Entry), at the time that terminal is handed over from any other bass station to relevant base station and at the time of rearrangement of terminals every fixed period. First, base station judges the number of terminals which presently reside in area covered by the base station (step 111) and compares the number of terminals with the previously prescribed threshold thereof (step 112). When the number of terminals is smaller than the prescribed threshold, allocation to frequency bands of boundary areas of cell indicated by 13, 15 and 17 in FIGS. 2 and 3 is performed (step 113) and judgment is ended. When the number of terminals is equal to or larger than the prescribed threshold, base station judges whether terminals reside in boundary area or central area of cell (step 114). Identification standards of boundary area and central area of cell can use CINR or distance of propagation path CINR represents measured results of CINR informed to base station by terminals. Distance of propagation path represents estimated distance of propagation path informed to base station by terminals or estimated distance of propagation path of terminals calculated by base station. For example, the estimated distance of propagation path can be calculated by base station on the basis of transmission power informed to base station by terminals and RSSI received by base station. Terminal in boundary area of cell is allocated to frequency band thereinafter referred to as FA_OUT) for boundary area of cell and terminal in central area of cell is allocated to frequency band (hereinafter referred to as FA_IN) for central area of cell in accordance with the result of step 114 (step 115). There is a case that the processing of this flowchart is not performed in specific system. For example, this case is the case where frequency of terminal connected by base station cannot be designated in INE led by terminal and destination of handover cannot be designated upon handover from any other base station.

Figure 8:
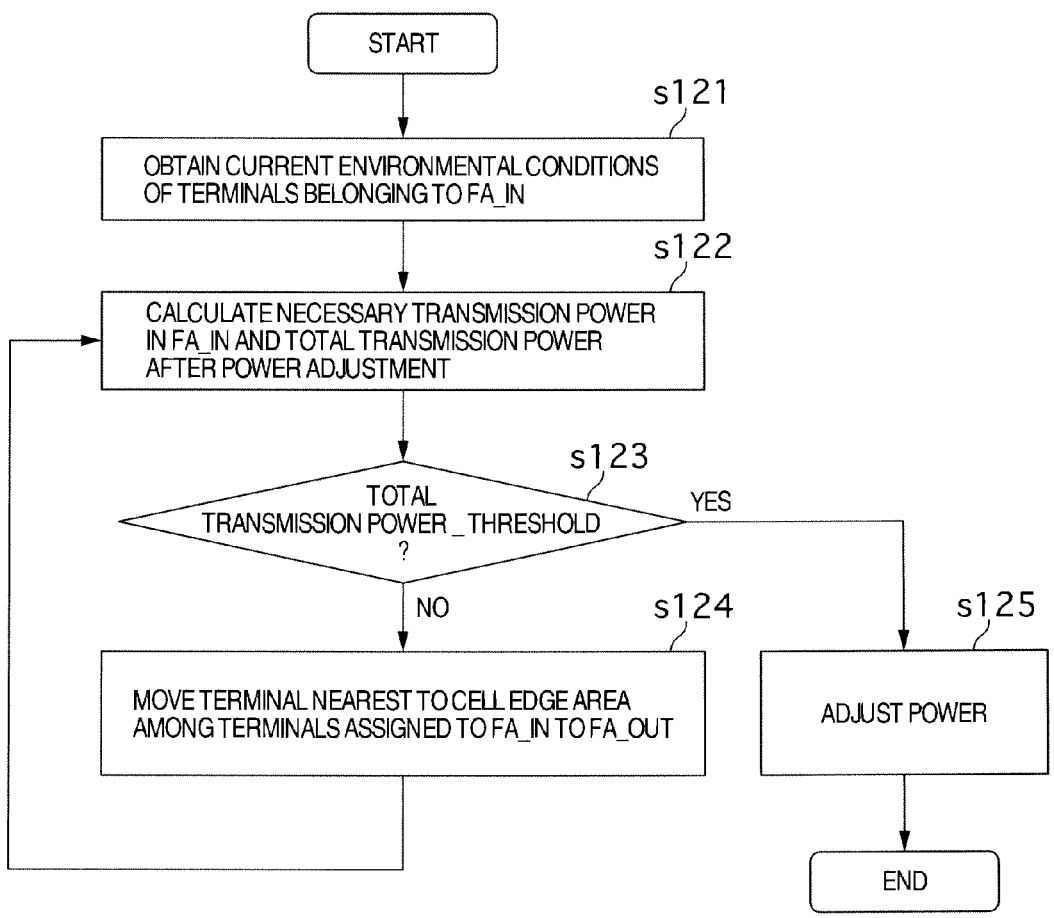
FIG. 8 is a flow chart showing processing of adjustment of transmission power an base station and scheduling of terminal in an embodiment of the present invention.

FIG. 8 is a flowchart showing an example of operation for adjustment of power and scheduling of terminal. In FIG. 8, adjustment of transmission power per sub-carrier in FA_IN and movement of terminals from FA_IN to FA_OUT are performed periodically. Base station obtains current environmental information of terminals belonging to FA_IN (step 121). Environmental information represents CINR or RSSI calculated from power obtained from terminals, report value of transmission power from terminals, packet error rate and the like. Packet error rate represents a ratio of NACK (Non-ACKnowledgement) to ACK (ACKnowledgement) in packet control of transmitting ACK and NACK returned as response to trans on packet from reception side thereof.

Next, necessary transmission power per sub-carrier in FA_IN is calculated from obtained environmental information to satisfy previously set standards and total transmission power of base station in case where necessary transmission power is calculated so as to satisfy previously set standards is calculated (step 122). The previously set standards are for example, CINR for satisfying throughput of terminal, CINR for satisfying target modulation system of terminal, CINR that terminal does not perform handover in terminal leading manner and can be set in accordance with purpose. The standards can be set to different values for each frequency in FA_IN to have freedom degree. The calculated result in step 122 is compared with threshold of total transmission power. When total transmission power does not exceed threshold of base station as a result of step 123 power is adjusted so that total transmission power is adjusted to be equal to transmission power per sub-carrier in FA_IN calculated in step 122 (step 125). Output of FA_IN is sometimes increased or decreased or is set to maintain power. Base station can transmit only necessary power by operation in step 125. As a result of step 123, when total transmission power exceeds threshold of base station, terminal nearest to cell boundary among terminals allocated to FA_IN is moved to FA_OUT (step 124).

Processing operation is returned to step 122 after step 124 and transmission power is calculated again. Since terminal nearest to cell boundary is moved in step 124, it is considered that necessary transmission power per sub-carrier in FA_IN is reduced. Accordingly transmission power can be reduced in step 125. When necessary transmission power per sub-carrier in FA_IN is not reduced, processing in steps 124, 122 and 123 is repeated again.

Figure 9:
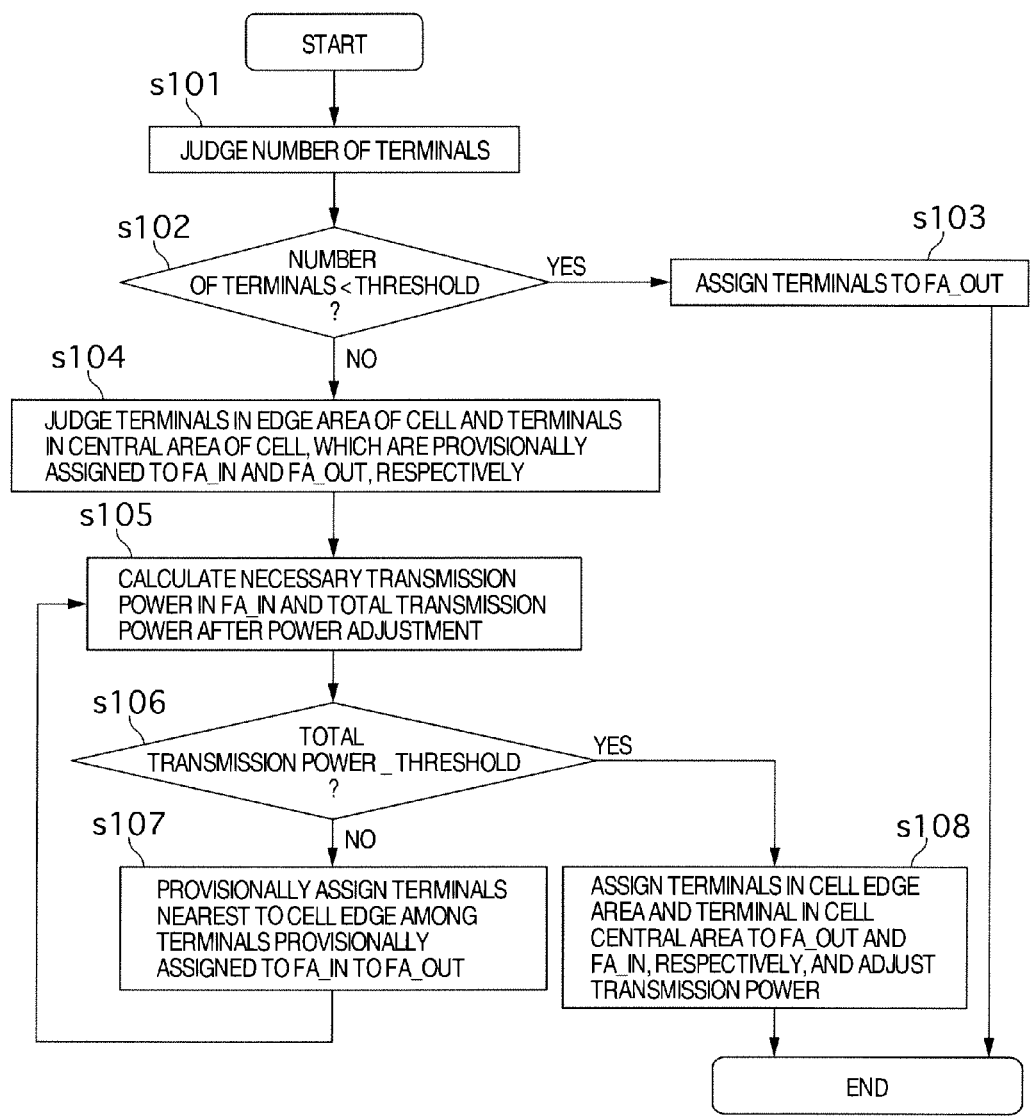
FIG. 9 is a flow chart showing processing of allocation of terminals in base station and power control in an embodiment of the present invention.

The algorithm obtained by combining algorithm of FIG. 7 with algorithm of FIG. 8 to perform allocation of terminals and adjustment of power is shown in FIG. 9

When INE request is received from terminal, base station judges the number of terminals which presently reside in area covered by base station (step 101). The number of terminals is compared with previously prescribed threshold (step 102) and when the number of terminals is smaller than the threshold, terminals are allocated to FA_OUT shown by 13, 15 and 17 of FIGS. 2 and 3 (step 103) and judgment is ended. When the number of terminals is equal to or larger than the threshold, terminals are distinguished to be terminals in boundary area of cell and terminals in cell central area of cell and are provisionally allocated to FA_IN and FA_OUT (step 104). The standards of distinguishing boundary area and central area of cell can use CINR or RSSI similarly to FIG. 8. Necessary transmission power per sub-carrier in FA_IN in case where allocation is made in accordance with provisional allocation result is calculated and total transmission power after adjustment of power is calculated (step 105). The total transmission power of calculated result is compared with previously prescribed threshold of total transmission power (step 106). When total transmission power is equal to or larger than threshold, terminals nearest to boundary area of cell among terminals provisionally allocated to FA_IN are provisionally allocated to FA_OUT (step 107). After processing of step 107, processing is returned to step 105 and transmission power is calculated again. When total transmission power is smaller than threshold in step 106, terminals in boundary area of cell and terminals in central area of cell are allocated in FA_OUT and FA_IN, respectively, as allocated provisionally and transmission power is adjusted to be necessary transmission power per subs carrier in step 105 (step 108) and judgment is ended.

In the processing of FIGS. 8 and 9, terminals are moved from FA_IN to FA_OUT, although there is a case where lack of balance occurs in the number of terminals in FA_OUT and FA_IN. Accordingly, when transmission power in FA_IN is equal to or smaller than previously set standards, terminals are moved from FA_OUT to FA_IN in accordance with algorithm of FIG. 10. The algorithm shown in FIG. 10 is now described.

Figure 10:
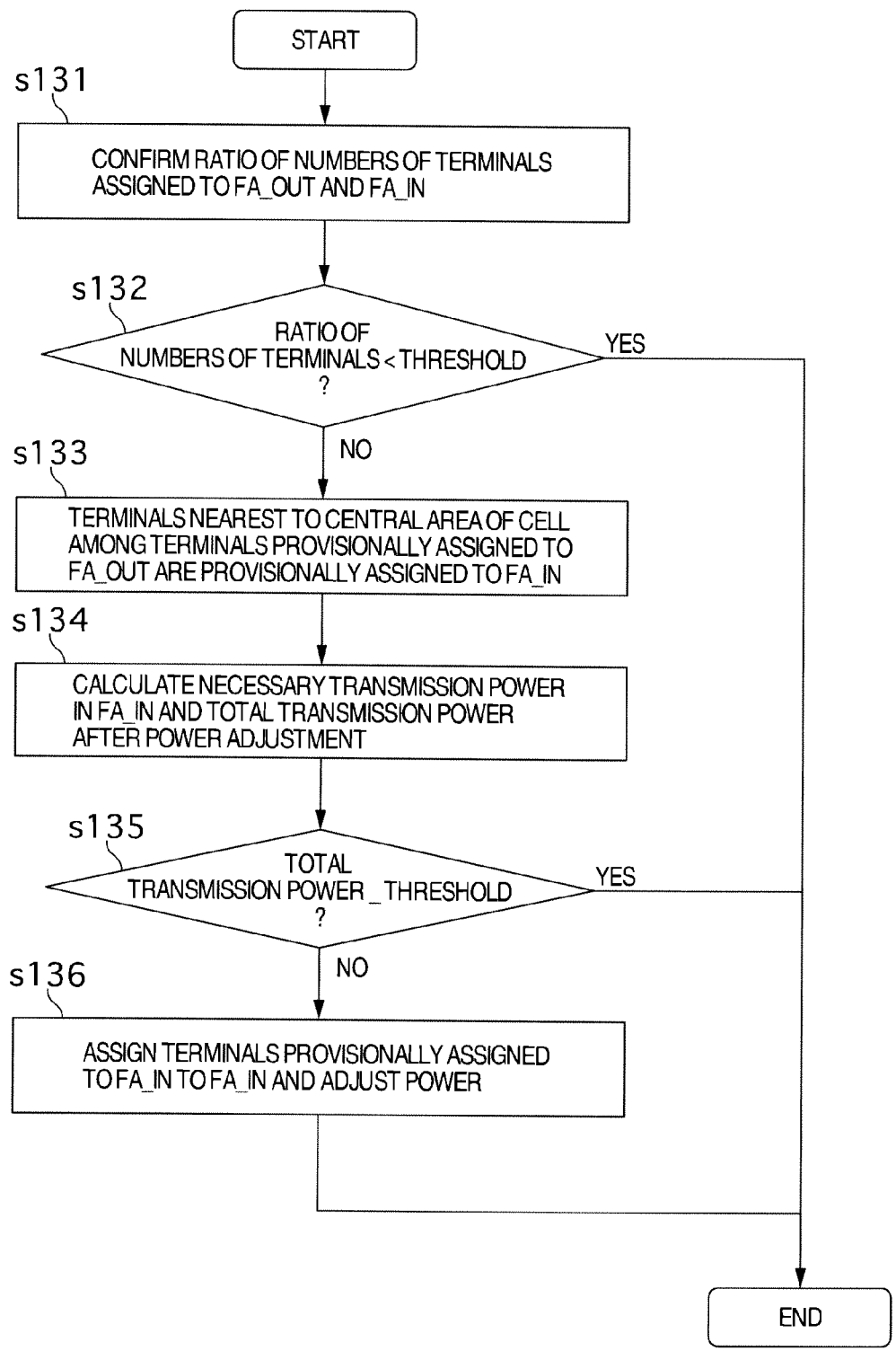
FIG. 10 is a flow chart showing an example of algorithm at the time that terminals of FA_PUT are moved to FA_IN in accordance with the ratio of terminal numbers in FA_OUT and FA_IN.

FIG. 10 is a flowchart showing an example of algorithm of moving terminals from FA_OUT to FA_IN in accordance with the ratio of the numbers of terminals in FA_OUT and FA_IN.

First, the numbers of terminals allocated to FA_OUT and FA_IN are confirmed in step 131. Then, in step 132, the ratio of numbers of terminals is compared with threshold. When the ratio of numbers of terminals is smaller than threshold in step 132, judgment is ended. When the ratio of numbers of terminals is equal to or larger than threshold in step 132, processing proceeds to step 133. In step 133, terminals nearest to central area of cell among terminals allocated to FA_OUT are provisionally allocated to FA_IN. Thereafter, in step 134, necessary transmission power per sub-carrier in FA_IN is calculated. Then, when total transmission power is equal to or larger than standard value as a result of step 134 (step is judged that terminals cannot be moved to FA_IN and judgment is ended. When total transmission power is smaller than standard value as a result of step 135, terminals provisionally allocated to FA_IN are allocated to FA_IN and transmission power is adjusted. This algorithm is an example in which the ratio of the numbers of terminals is judged in step 132 and total transmission power is judged in step 135, although total transmission power may be first judged and the algorithm may be then performed when total transmission power is equal to or smaller than standard value.

Figure 11:
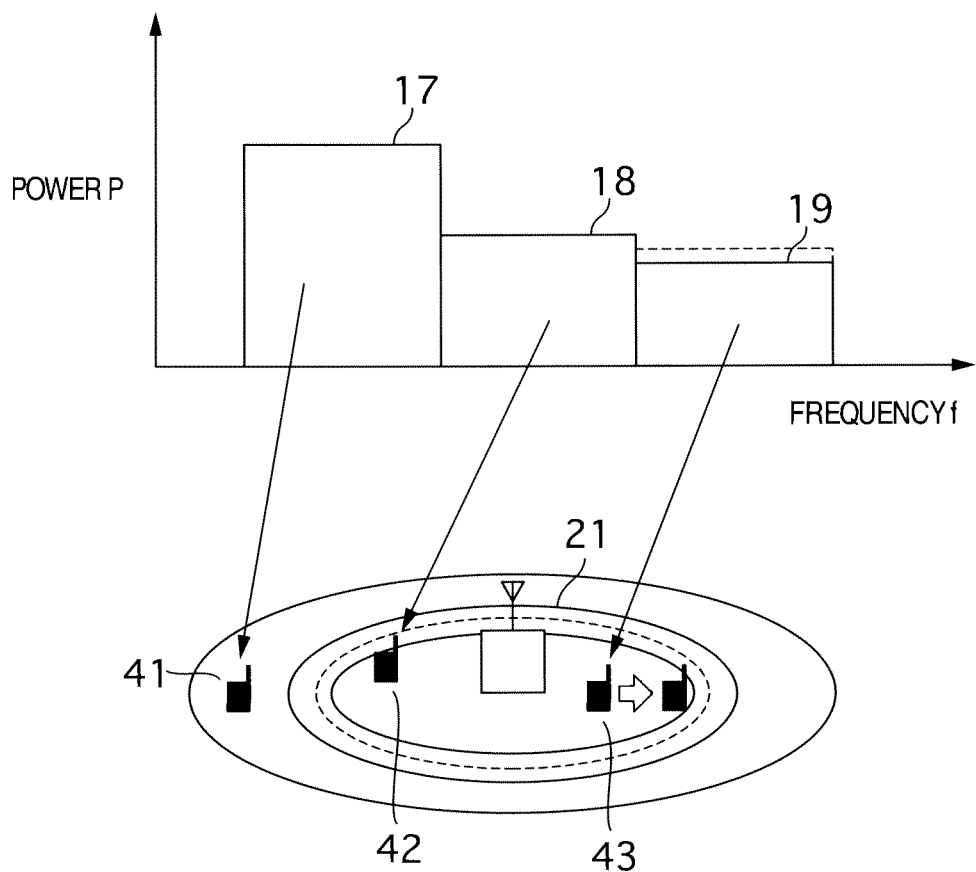
FIG. 11 illustrates scheduling in an embodiment of the present invention.
Figure 12:
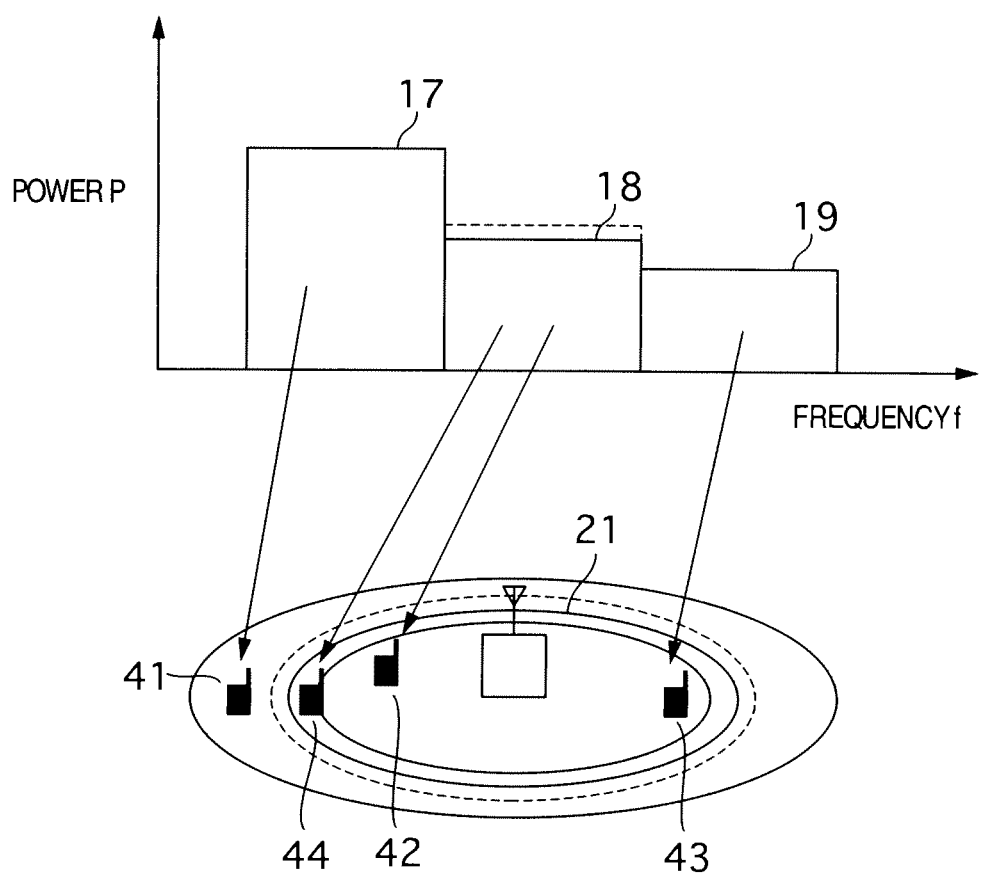
FIG. 12 illustrates scheduling in an embodiment of the present invention.
Figure 13:
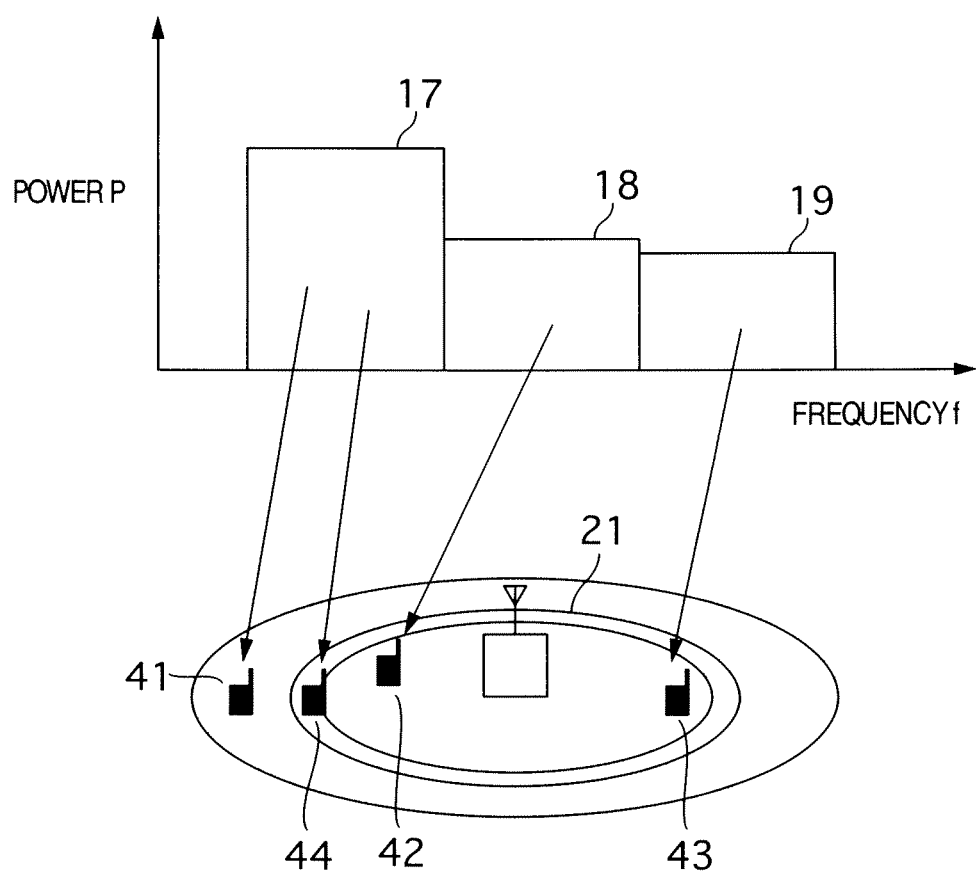
FIG. 13 illustrates scheduling in an embodiment of the present invention.

Referring now to FIGS. 11, 12 and 13, adjustment of transmission power and scheduling of terminals in the embodiment of the present invention are described.

FIGS. 11 to 13 illustrate scheduling operation in the embodiment of the present invention.

In FIG. 11, terminals 41, 42 and 43 are connected to base station 21. Terminal 41 in boundary area of cell is allocated frequency 17. Terminal 42 in central area of cell is allocated frequency 18. Terminal 43 in central area of cell is allocated frequency 19. When terminal 43 is moved toward boundary of cell, for example, necessary transmission power per sub-carrier in FA_IN is increased as compared with transmission power before movement in step 105 of FIG. 1. When it is judged that necessary transmission power is equal to or smaller than total transmission power in step 106 of FIG. 1, transmission power per sub-carrier for frequency 19 is increased, so that coverage of frequency 19 is also spread.

FIG. 12 shows that another terminal 44 is newly connected after the state shown in FIG. 11. When to final 44 is judged to be terminal residing in central area of cell in step 102 of FIG. 9, the terminal 44 is allocated frequency 17. Alternatively, it is also assumed that the terminal 44 is connected using frequency 17 in INE led by terminal. Terminal 44 is positioned nearest to boundary area of cell among terminals allocated frequency 18 and does not satisfy the necessary standards of CINR. Accordingly, increase of transmission power per sub-carrier is investigated.

FIG. 13 shows the case where terminal 44 is allocated frequency 17 after the state shown in FIG. 12. Increase of transmission power per sub-carrier is investigated in FIG. 12, although since it is judged that total transmission power is larger than threshold, terminal 44 is moved from frequency 18 to frequency 17. Consequently, frequency 18 is not required to increase transmission power per sub-carrier or transmission power per sub-carrier can be reduced.

An example of operation in case where terminal is grieved between frequencies is now described.

Figure 14:
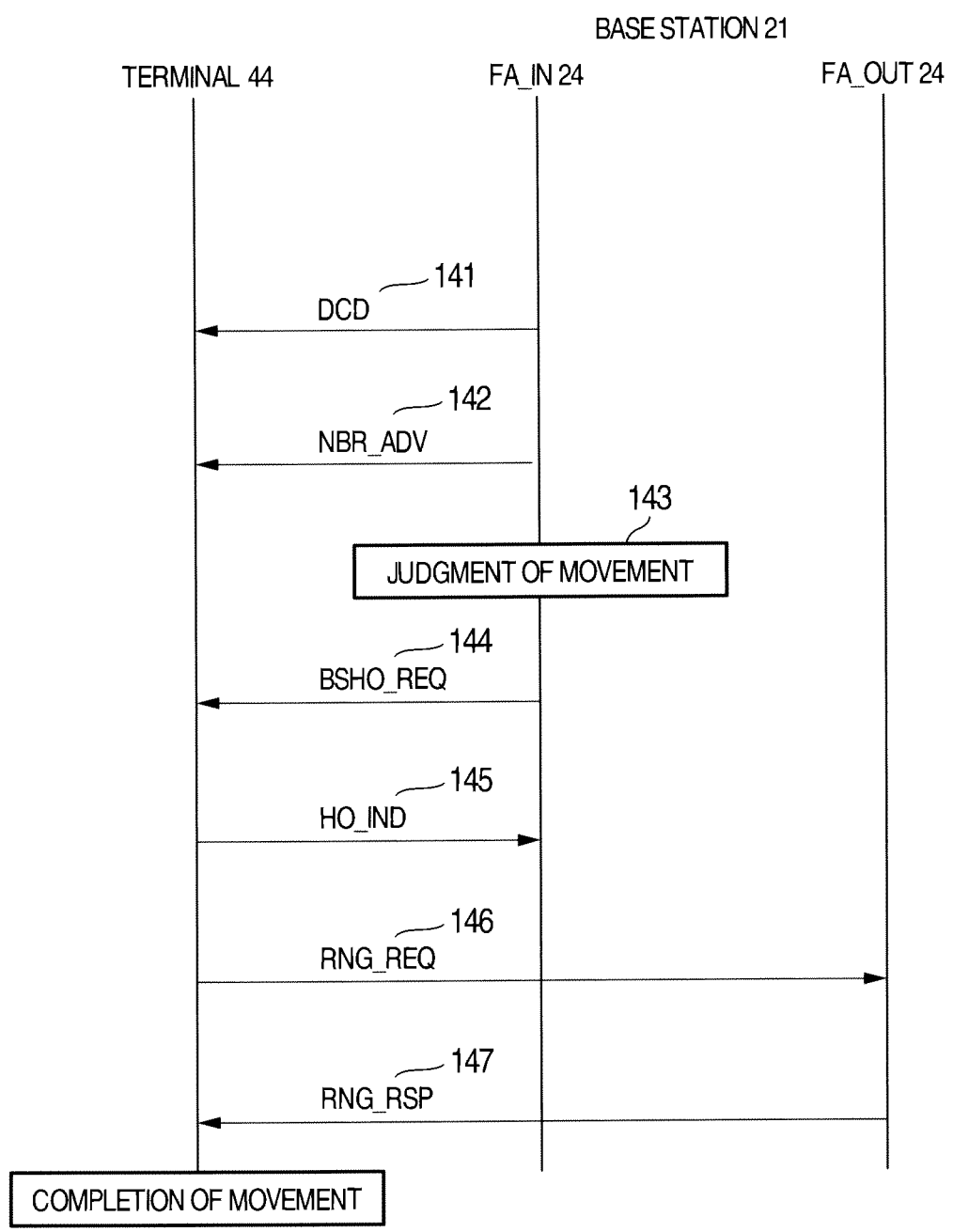
FIG. 14 shows sequence operation at the time that handover is used for movement between frequencies in base station.

FIG. 14 shows an example of sequence operation at the time that base station uses handover in movement of between frequencies. In Mobile WiMAX, both of system where handover is perform shed in base station leading manner and system where handover is performed in terminal leading manner are available, although the present invention is described by taking the case where handover is performed in base station leading manner as an example. Usually, base station receives information of adjacent base station by exchange of information between base stations and transmits information of adjacent base station to terminals. Base station notifies DCD (Downlink Channel Descriptor) message 141 different in each frequency to terminals. Accordingly, ID (hereinafter referred to as BSID) for identifying base station is different in each frequency. NBR-ADV (neighbor advertisement) message 142 transmitted terminal 44 using frequency 24 contains information of frequency 25 of the same base station. By notifying information of frequency 25 beforehand, terminal 44 can understand contents of DCD before handover. When movement of terminal 44 from frequency 24 to frequency 25 is judged by base station (step 143), BSHO_REQ (BS HO request) message 144 containing BSID of frequency 25 as recommendatory base station is transmitted to terminal 44 using frequency Terminal 44 transmits HO_IND (HO indication) message 145 containing BSID of frequency 25 as information of base station of handover destination to base station. Terminal 44 transmits RNG_REQ (Ranging request) message 146 to base station to notify handover base station. Base station which has received RNG_REQ returns RNG_RSP (Ranging response) message 147 to terminal 44 to notify that handover is completed.

The effects of the present invention are now described.

Figure 15:
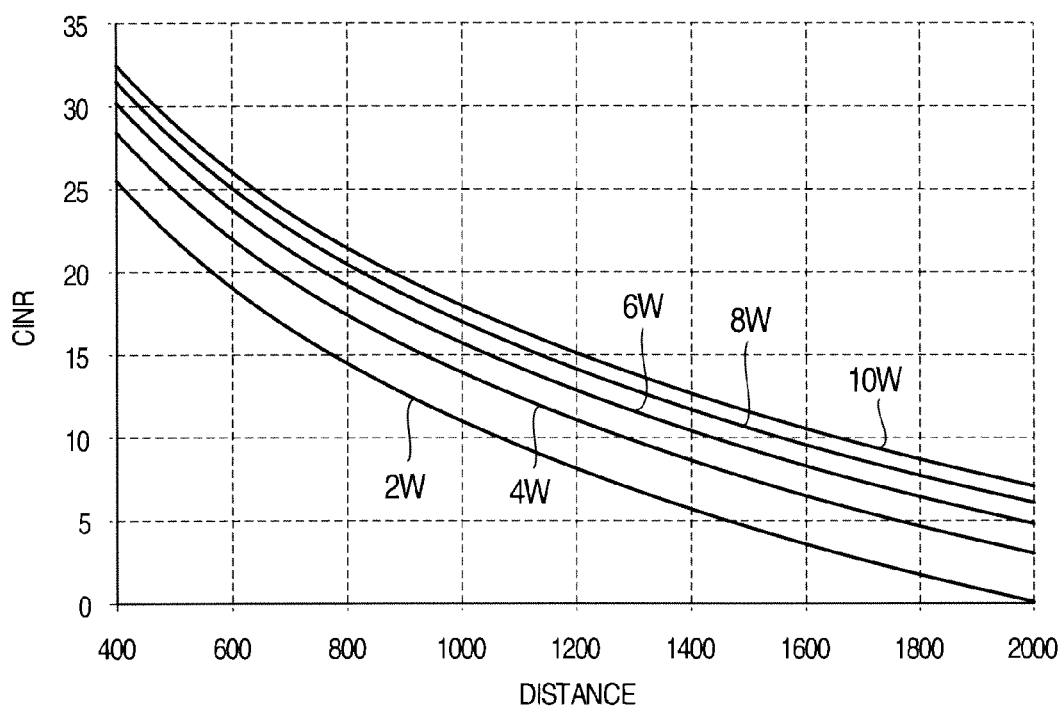
FIG. 15 is a graph showing simulation result of propagation distance for transmission powers in base station and CINR obtained by terminal.

FIG. 15 is a diagram showing simulation result of propagation distance for transmission powers in base station and CINR obtained by MS in Mobile WiMAX. In FIG. 15, illation is performed using 1024 sub-carriers in the band of 10 MHz in Mobile WiMAX. In mutation, noise level is calculated using thermal noise level. Thermal noises occur by motion of free electrons in conductor by thermal energy and are uniformly distributed in all frequencies. Accordingly, even in any receiver, thermal noises always occur in conductor provided in input terminal (or circuit) of receiver. In case of environment where interference higher than thermal noises occurs, CINR gets worse than the simulation result. When propagation distance is confirmed in specific CINR standards, it is understood that distance in which CINR can be secured is increased as transmission power is increased. For example, when maximum value of total transmission power of base station is 20 W, transmission power of frequency in FA_OUT is set to 10 W and CINR=15 dB is set to standards, it is understood that transmission powers of 2 W, 8 W and 10 W are proper in case where propagation distances from base station to terminals are 700 m, 1100 m and 1200 m in the state that terminals are allocated respective frequencies. Further, it is understood that transmission powers of 4 W, 6 W and 10 W are proper when propagation distances from base station to terminals are 900 m, 1000 m and 1200 m in the state that terminals are allocated respective frequencies.

Embodiment 2

The second embodiment 2 is now described with reference to FIG. 16. Description about parts which perform the same operation as the embodiment 1 is omitted.

Figure 16:
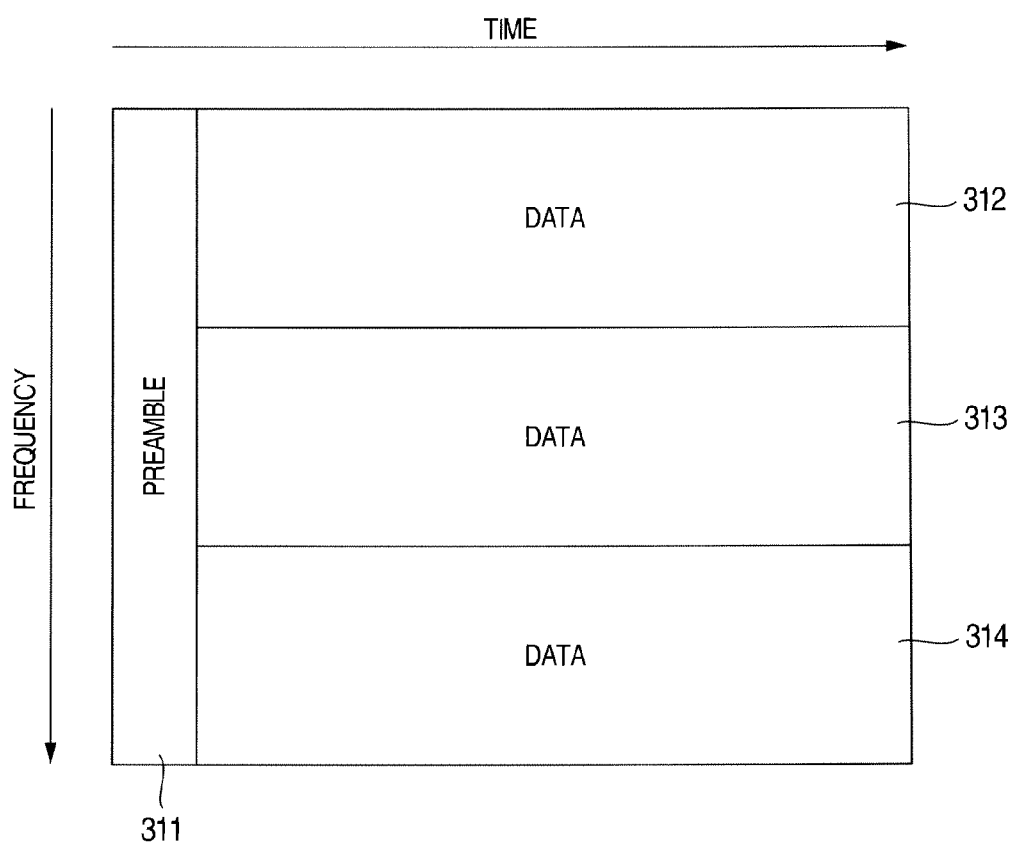
FIG. 16 is a mapping diagram for frequency axis and time axis of transmission frame of embodiment 2.

FIG. 16 is a mapping diagram for frequency axis and time axis of transmission frame of the embodiment. In the embodiment, preamble 311 is provided at the head of time axis and DATA area is divided into three frequency domains 312, 313 and 314 in one frequency group. The division into frequency domains 312, 313 and 314 is performed logically and terminals are subjected to frequency scheduling in accordance with only area indication named MAP information from base station contained in the head of DATA area. There is a case where physical arrangement is arrangement in which the above logical arrangement is dispersed within one frequency group by pseudorandom series named Perm base and accordingly logical arrangement is dispersed physically, so that only specific sub-carrier is prevented from continuously receiving interference between adjacent base stations. The embodiment contains the case where dispersion using Perm base is made and the case where the dispersion is not made.

In the embodiment, transmission power per sub-carrier is weighted in each DATA area to thereby distinguish FA_OUT and FA_IN. In FA_OUT, transmission power per sub-carrier is fixed similarly to the embodiment 1 and in FA_IN transmission power per sub-carrier is variable.

The algorithm of adjustment of power and operation at the of movement of terminals for the purpose of power adjustment of the embodiment 2 is the same as FIGS. 7, 8, 9 and 10 of the embodiment 1

Operation of power adjustment and scheduling of terminals of the embodiment 2 is the same as FIGS. 11, 12 and 13 of the embodiment 1.

In the embodiment 2, base station can utilize MAP information of base station in move lent of terminals between frequencies. For example, in frequency domains 312 and 3 of FIG. 16, MAP information is utilized in a certain time to perform scheduling in only frequency domain 312 and when movement between frequencies is judged, scheduling is performed in only frequency domain 313. In this manner, terminals can be moved.

The effects of the embodiment 2 are the same as FIG. 15 of the embodiment 1

Embodiment 3

The embodiment 3 is now described with reference to FIG. 17. Description about parts which perform the same operation as the embodiments 1 and 2 is omitted.

Figure 17:
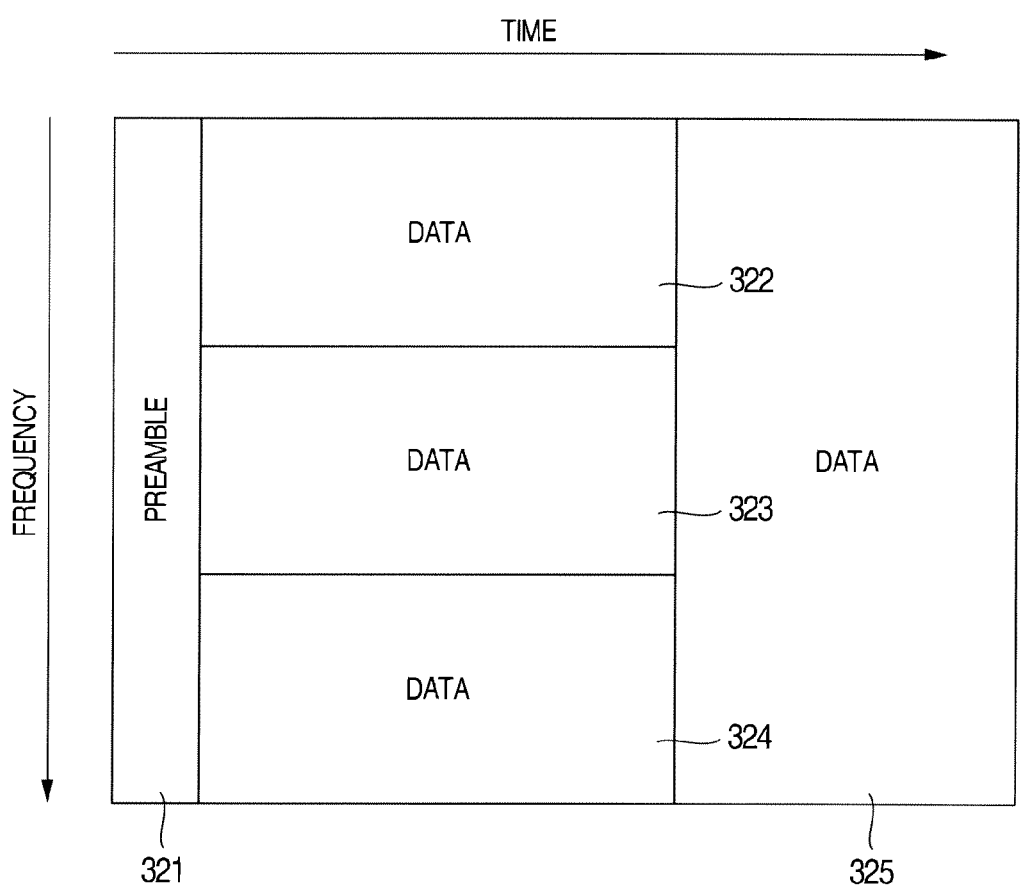
FIG. 17 is a mapping diagram for frequency axis and tune axis of transmission frame of embodiment 3.

FIG. 17 is a mapping diagram for frequency axis and time axis of transmission frame of the embodiment. In the embodiment, preamble 321 is provided at the head of time axis and DATA area is divided into three frequency domains 322, 323 and 324 in one frequency group. DATA areas 322, 323 and 324 and DATA area 325 are divided by time domain. The division into frequency domains 322, 323 and 324 is performed logically and terminals are subjected to frequency scheduling in accordance with only area indication named MAP information from base station contained in the head of DATA area Maximum transmission power of base station is limited by any one of total transmission power of data areas 322, 323 and 324 and transmission power of data area 325.

Algorithm of adjustment of power and operation at the time of movement of terminals for the purpose of power adjustment of the embodiment 3 is the same as FIGS. 7, 8, 9 and 10 of the embodiment 1

Operation of power adjustment and scheduling of terminals of the embodiment 3 is the same as FIGS. 11, 12 and 13 of the embodiment 1.

Movement of terminals between frequencies of the embodiment 3 is the same as the embodiment 2

The effects of the embodiment 3 are the same as FIG. 15 of the embodiment 1

Finally, the technical features of the present invention are listed.

In base station, transmission frequency band is divided into at least 2 or more frequency bands. Transmission power per sub-carrier upon communication is fixed in frequency band having highest transmission power per sub-carrier among divided frequency bands and transmission power per sub-carrier in other frequency bands is set to be variable so as to satisfy necessary power of terminals connected, so that transmission power is set to be variable to reduce total transmission power to be equal to or smaller than a prescribed value.

In base station, transmission power in the other frequency bands is adjusted to be variable, so that when total transmission power exceeds the prescribed value, terminal connected in the other frequency bands is moved to frequency band having highest transmission power per sub-carrier.

Frequency band is divided in each frequency group having different synchronous signals.

Alternatively frequency band is divided in frequency having the single synchronous signal.

Alternatively, frequency band is divided in frequency having the single synchronous signal and is separated in time axis, so that the divided frequencies are treated as the same resource for time.

Alternatively, frequency band is divided in different communication system unit and is further divided in at least one communication system.

Adjustment of total transmission power may be made in all frequency bands used.

Alternatively, adjustment of total transmission power may be trade in the other frequency bands.

Movement means of terminal between frequency bands is handover.

Alternatively, movement means of terminal between frequency bands is frequency scheduling.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A base station which communicates with a plurality of terminals in a wireless communication system by radio, comprising a controller of the base station configured to:
   divide a frequency band allocated to the wireless communication system into a plurality of frequency bands;
   when a first frequency band of the plurality of frequency bands is allocated to a first terminal group and a second frequency band is allocated to a second terminal group different from the first terminal group to make communication, then
   control a total transmission power for the first and the second terminal groups to be equal to or smaller than a threshold value of a maximum total transmission power previously set for the base station; and
   fix a transmission power per sub-carrier in the first frequency band, comprising:
      calculating the transmission power per sub-carrier based on a target transmission power of each of the plurality of terminals for satisfying a previously set threshold in the second frequency band;
      comparing a value of the total transmission power with the maximum total transmission power;
      adjusting power based on the calculation of the transmission power per sub-carrier in a case in which a value of the maximum total transmission power is less than the threshold value; and
      further calculating the total transmission power when an increased number of terminals among the plurality of terminals are to be allocated to the first terminal group in a case in which the value of the maximum total transmission power is greater than or equal to the threshold value.

2. The base station according to claim 1, wherein:
   when the number of terminals in the second terminal group is larger than the previously set threshold, a terminal is selected based on environmental information for each terminal contained in the second terminal group, and the selected terminal is changed to the first terminal group so that the number of terminals in the second terminal group is equal to or smaller than the threshold.

3. The base station according to claim 1, wherein:
the second frequency band is further divided into the plurality of frequency bands to be allocated to the second terminal group, and the transmission power per sub-carrier is calculated for each of the plurality of frequency bands.

4. The base station according to claim 1, wherein:
communication between the base station and the plurality of terminals is carried out via orthogonal frequency division multiple connection,
a wireless resource of the base station is divided into a plurality of logical or physical frequency domains each containing a different synchronous signal at a head in a transmission frame, and
allocation of the first and second frequency bands and adjustment of the transmission power are made so as to correspond to the plurality of frequency domains in the transmission frame.

5. The base station according to claim 1, wherein:
communication between the base station and the plurality of terminals is carried out via orthogonal frequency division multiple connection, and a wireless resource of the base station is divided into a plurality of logical or physical frequency domains each containing a common synchronous signal at a head in a transmission frame, and
allocation of the first and second frequency bands and adjustment of the transmission power are made so as to correspond to the plurality of frequency domains in the transmission frame.

6. The base station according to claim 1, wherein:
each of the divided frequency bands is allocated to a different communication system.

7. A transmission power adjustment method in a base station which communicates with a plurality of terminals in a wireless communication system by radio, comprising:
dividing a frequency band allocated to the wireless communication system into a plurality of frequency bands; and
when a first frequency band of the plurality of frequency bands is allocated to a first terminal group, and a second frequency band is allocated to a second terminal group different from the first terminal group to make communication, then
controlling a total transmission power for the first and the second terminal groups so as to be equal to or smaller than a threshold value of a maximum total transmission power previously set in the base station; and
fixing a transmission power per sub-carrier in the first frequency band, comprising:
calculating the transmission power per sub-carrier based on a target transmission power of each of the plurality of terminals for satisfying a previously set threshold in the second frequency band,
comparing a value of the total transmission power with the maximum total transmission power;
adjusting power based on the calculating of the transmission power in a case in which a value of the maximum total transmission power is less than the threshold value; and
further calculating the total transmission power when an increased number of terminals are to be allocated to the first terminal group in a case in which the value of the maximum total transmission power is greater than or equal to the threshold value.

* * * * *